United States Patent
Hasegawa et al.

(10) Patent No.: US 8,094,176 B2
(45) Date of Patent: Jan. 10, 2012

(54) DRAWING APPARATUS AND METHOD, AND COMPUTER PROGRAM

(75) Inventors: Wataru Hasegawa, Tokorozawa (JP);
Toshiyuki Kaneko, Tokorozawa (JP);
Takashi Nakamura, Tokorozawa (JP);
Tetsuya Hayashi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 398 days.

(21) Appl. No.: 12/439,898

(22) PCT Filed: Sep. 22, 2006

(86) PCT No.: PCT/JP2006/318857
§ 371 (c)(1),
(2), (4) Date: Mar. 4, 2009

(87) PCT Pub. No.: WO2008/035435
PCT Pub. Date: Mar. 27, 2008

(65) Prior Publication Data
US 2009/0315970 A1    Dec. 24, 2009

(51) Int. Cl.
*B41J 2/435* (2006.01)
*G11B 5/09* (2006.01)
(52) U.S. Cl. .................. 347/224; 369/47.1
(58) Field of Classification Search ........... 347/224, 347/225, 229, 234, 248, 249; 369/30.45–30.47, 369/100, 47.1, 47.11, 47.38, 53.3, 53.37
See application file for complete search history.

(56) References Cited

U.S. PATENT DOCUMENTS

| | | | |
|---|---|---|---|
| 6,771,297 B2 | 8/2004 | Bronson | |
| 6,804,176 B1* | 10/2004 | Komazaki | 369/30.03 |
| 7,414,643 B2* | 8/2008 | Bahng | 347/224 |
| 2004/0141045 A1 | 7/2004 | Hanks | |
| 2004/0141046 A1 | 7/2004 | Hanks | |
| 2004/0141385 A1 | 7/2004 | Pettigrew et al. | |
| 2004/0141445 A1 | 7/2004 | Hanks | |
| 2005/0276190 A1* | 12/2005 | Kamiya et al. | 369/53.2 |

FOREIGN PATENT DOCUMENTS

| | | |
|---|---|---|
| JP | 2005-93052 | 4/2005 |
| JP | 2006-510158 | 3/2006 |
| JP | 2006-511034 | 3/2006 |
| JP | 2006-172606 | 6/2006 |

* cited by examiner

*Primary Examiner* — Hai C Pham
(74) *Attorney, Agent, or Firm* — Young & Thompson

(57) ABSTRACT

A plotting device (1) includes: plotting means (13) for plotting a desired pattern onto a label plane by applying a laser beam (LB) to the label plane (120) of a recording medium (100); drive means (15) for driving the plotting means along the label plane; voltage application means (17) for applying a first voltage and a second voltage for driving the drive means to the drive means; and control means (31) for controlling the voltage application means so that the first voltage and the second voltage have the same polarity and amplitude when the plotting means is positioned at the initial position corresponding to the position where plotting of the desired pattern onto the label plane is to be started.

6 Claims, 8 Drawing Sheets

[FIG. 1]
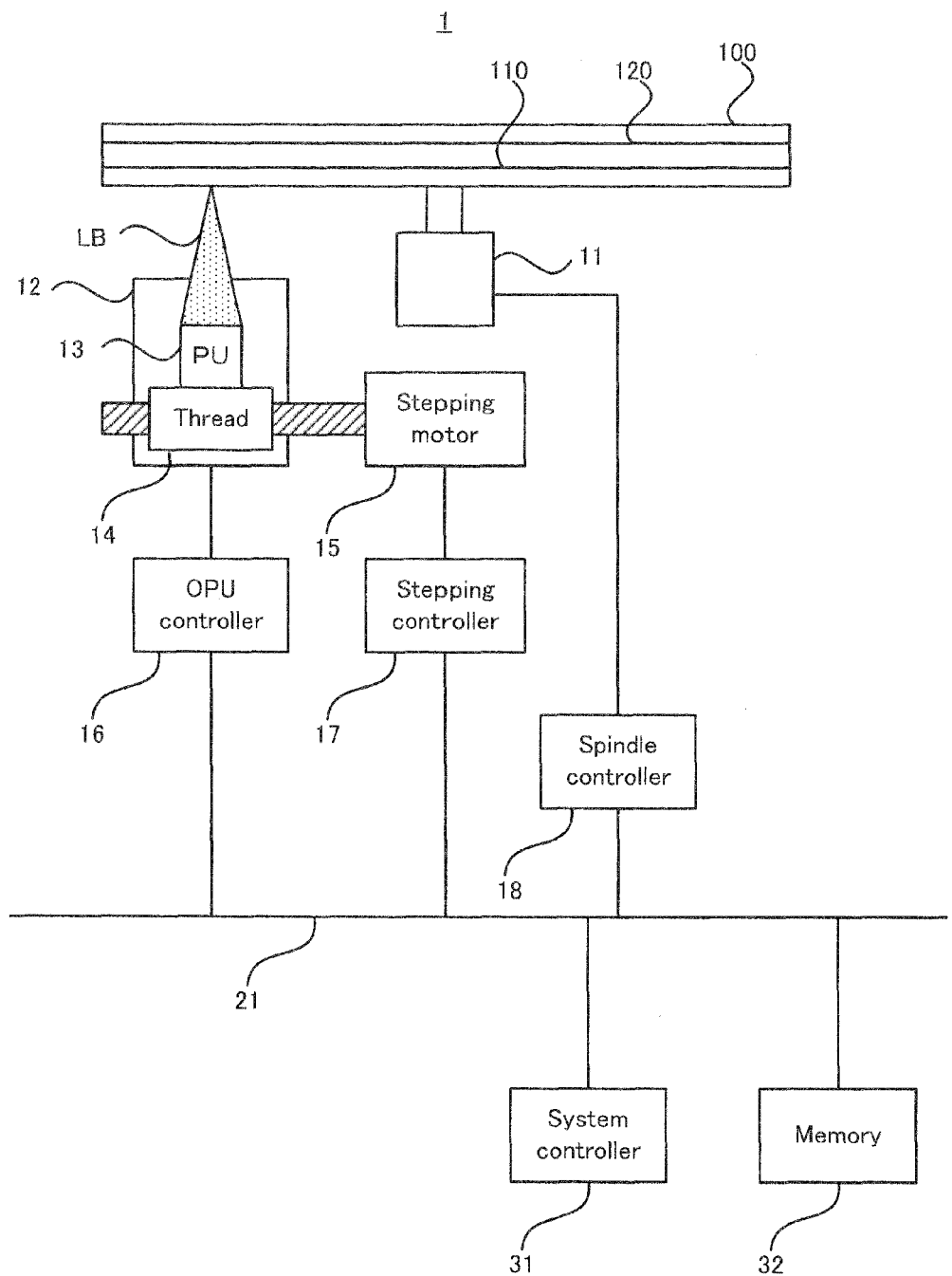

[FIG. 2]
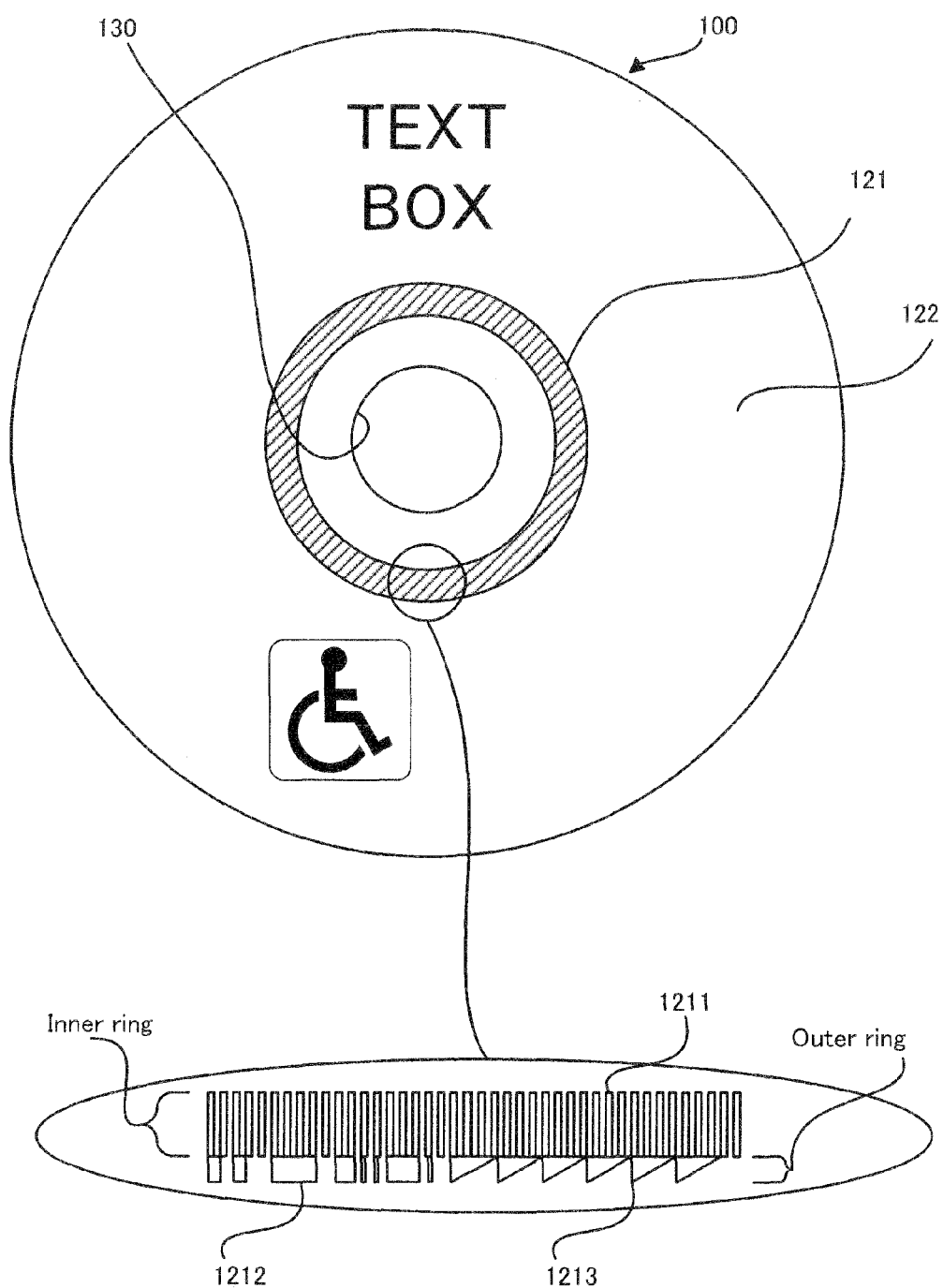

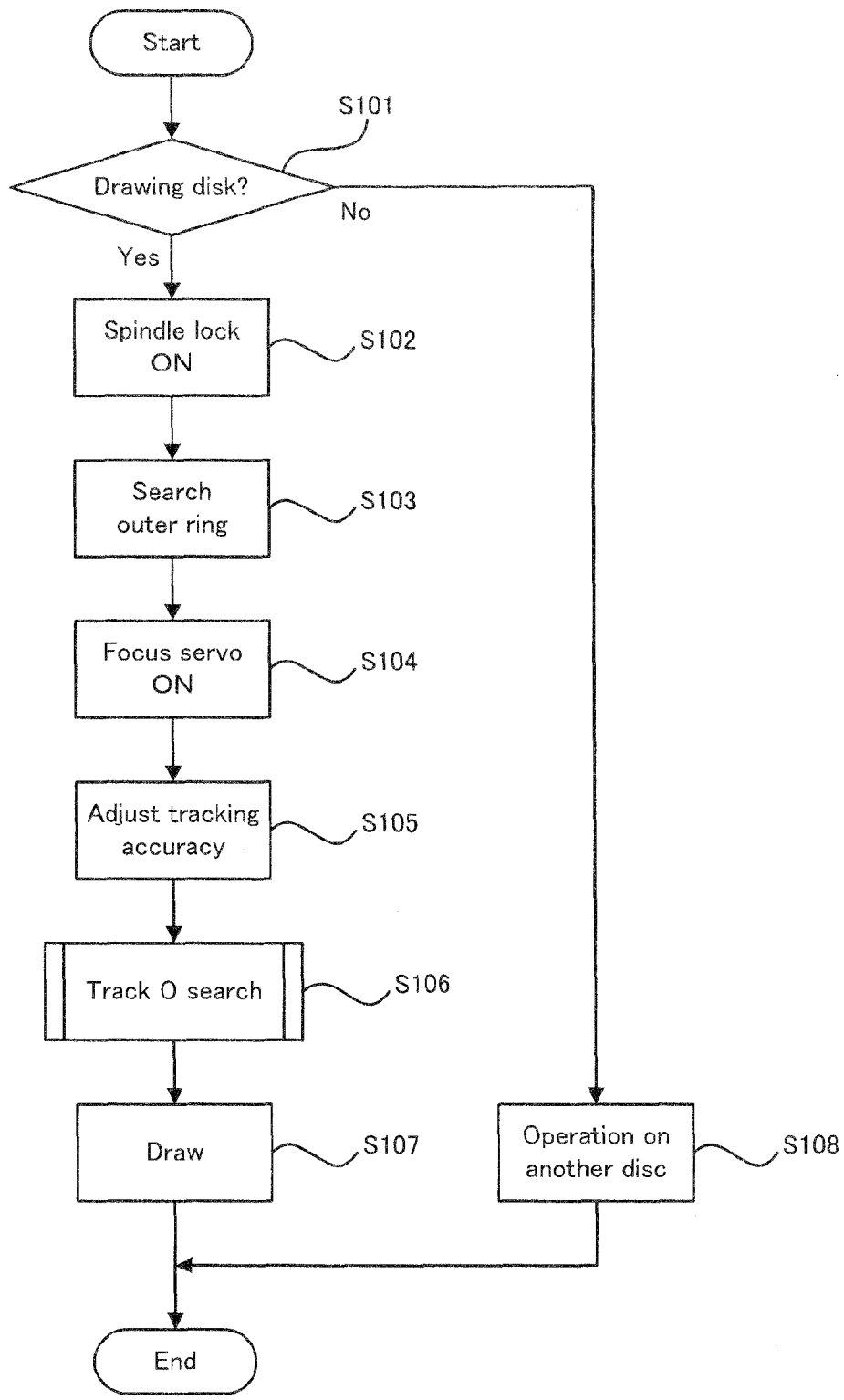
[FIG. 3]

[FIG. 4]
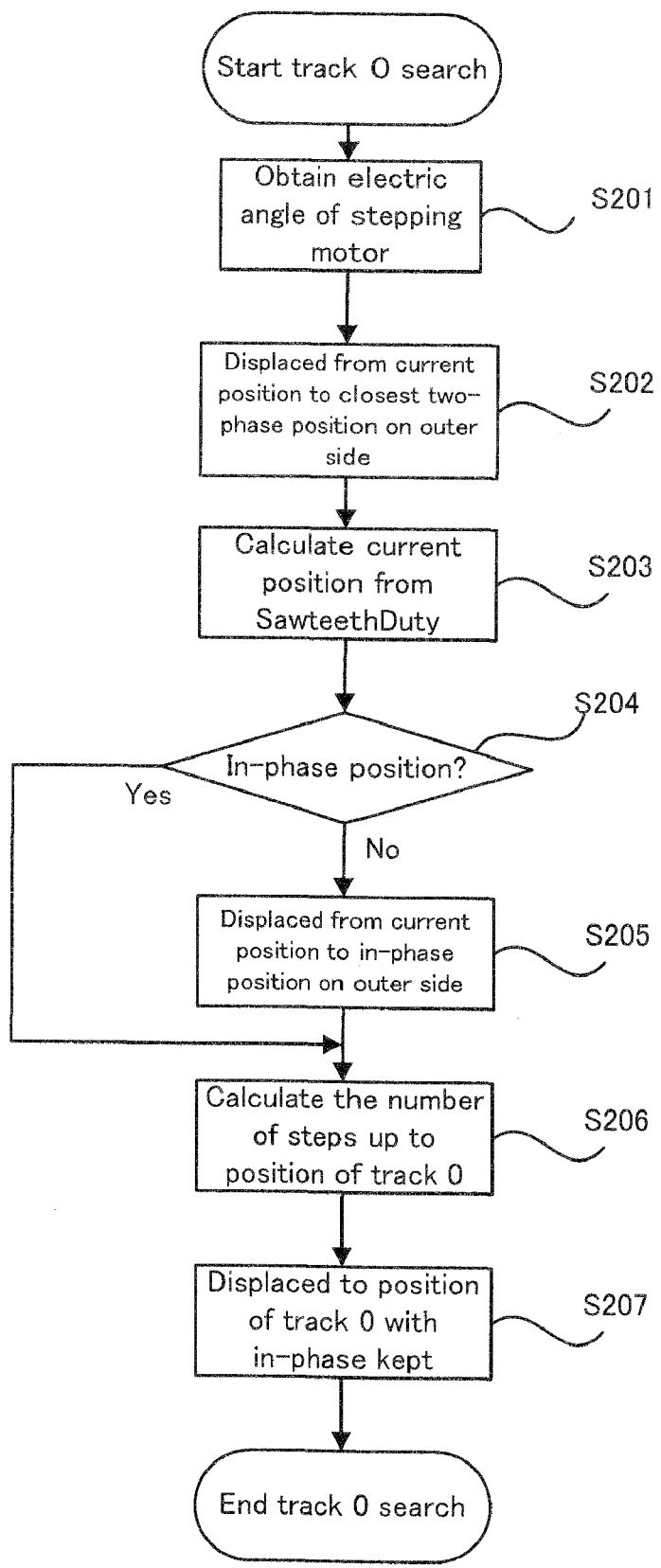

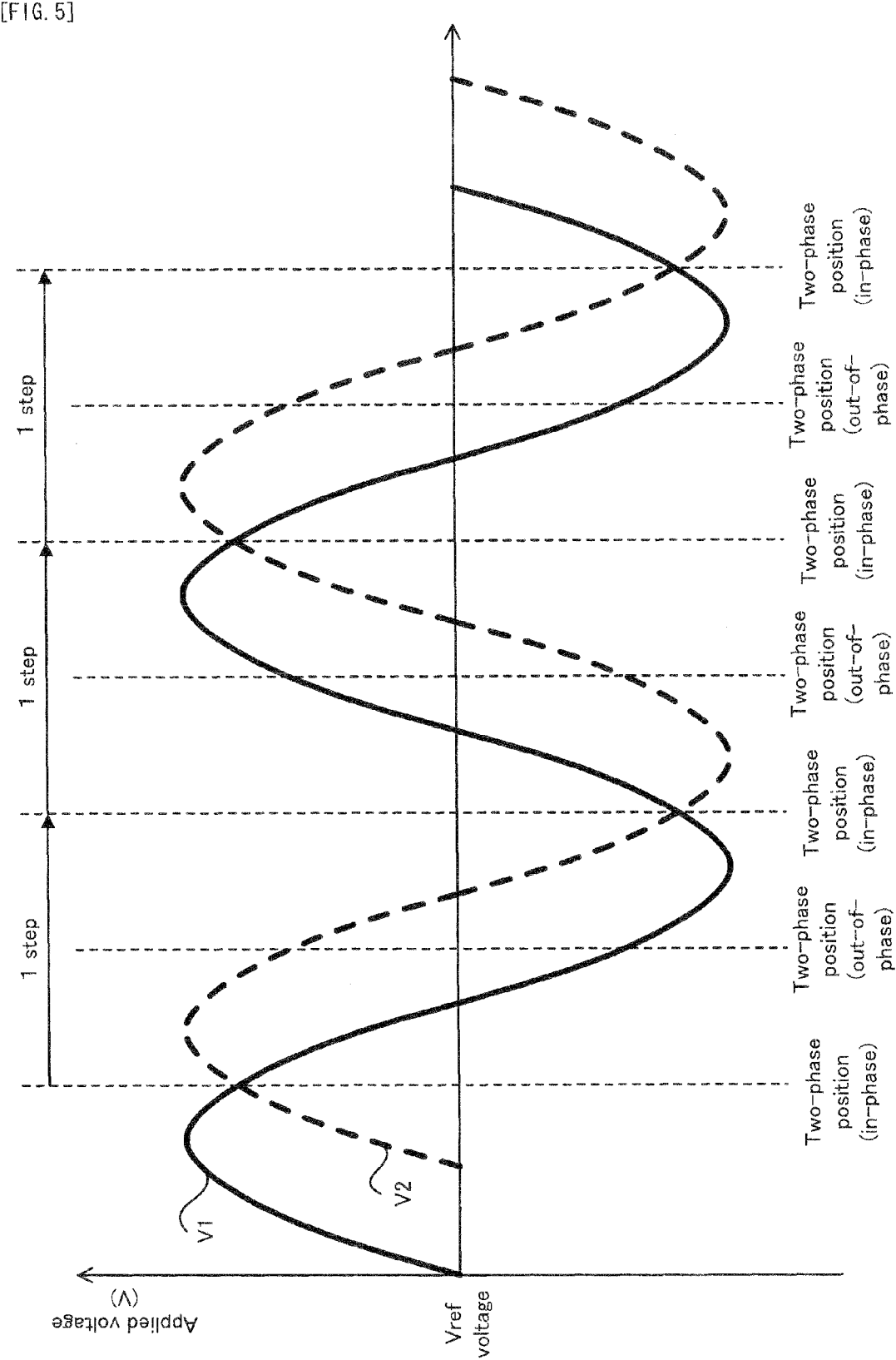
[FIG. 5]

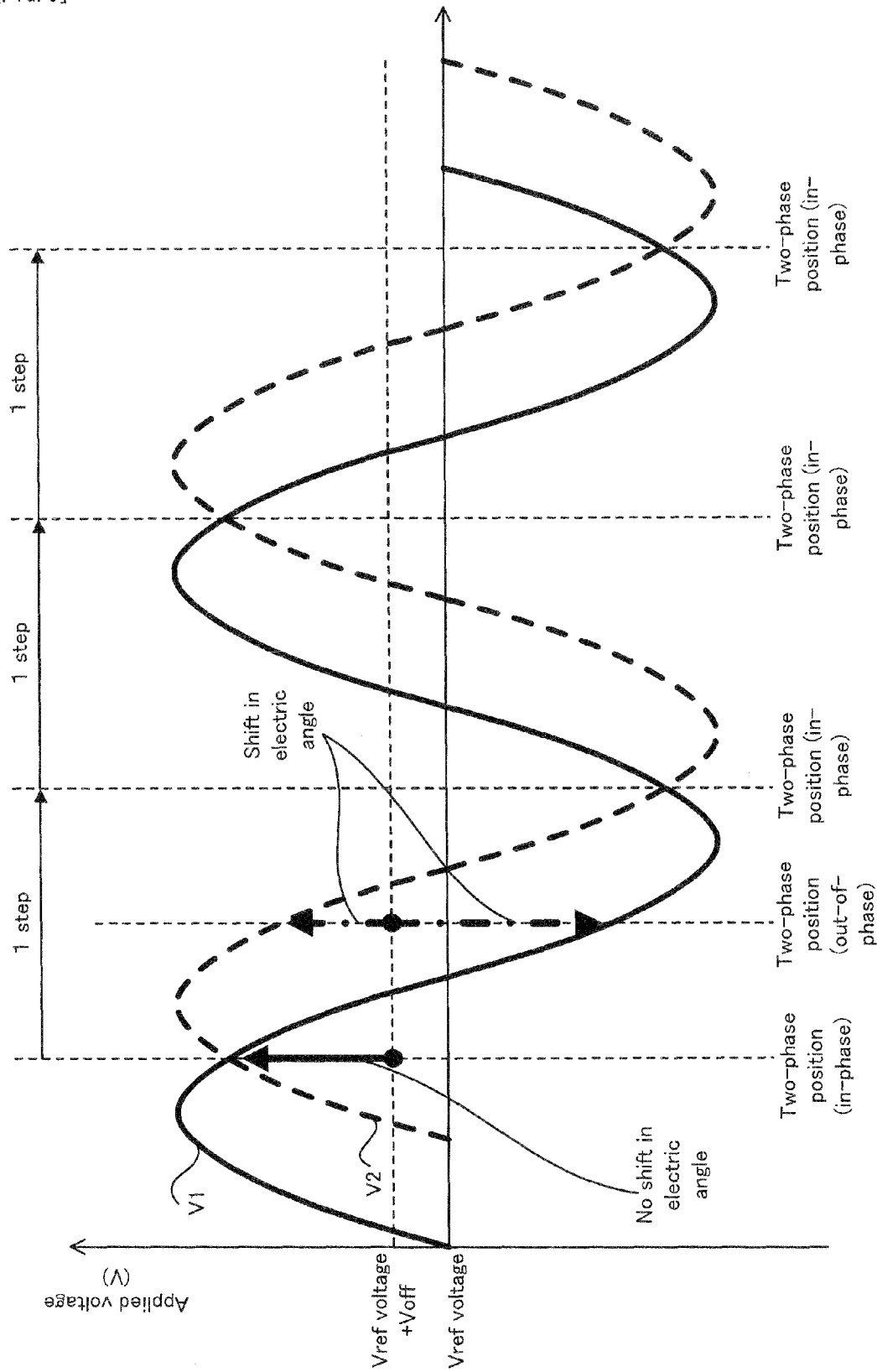
[FIG. 6]

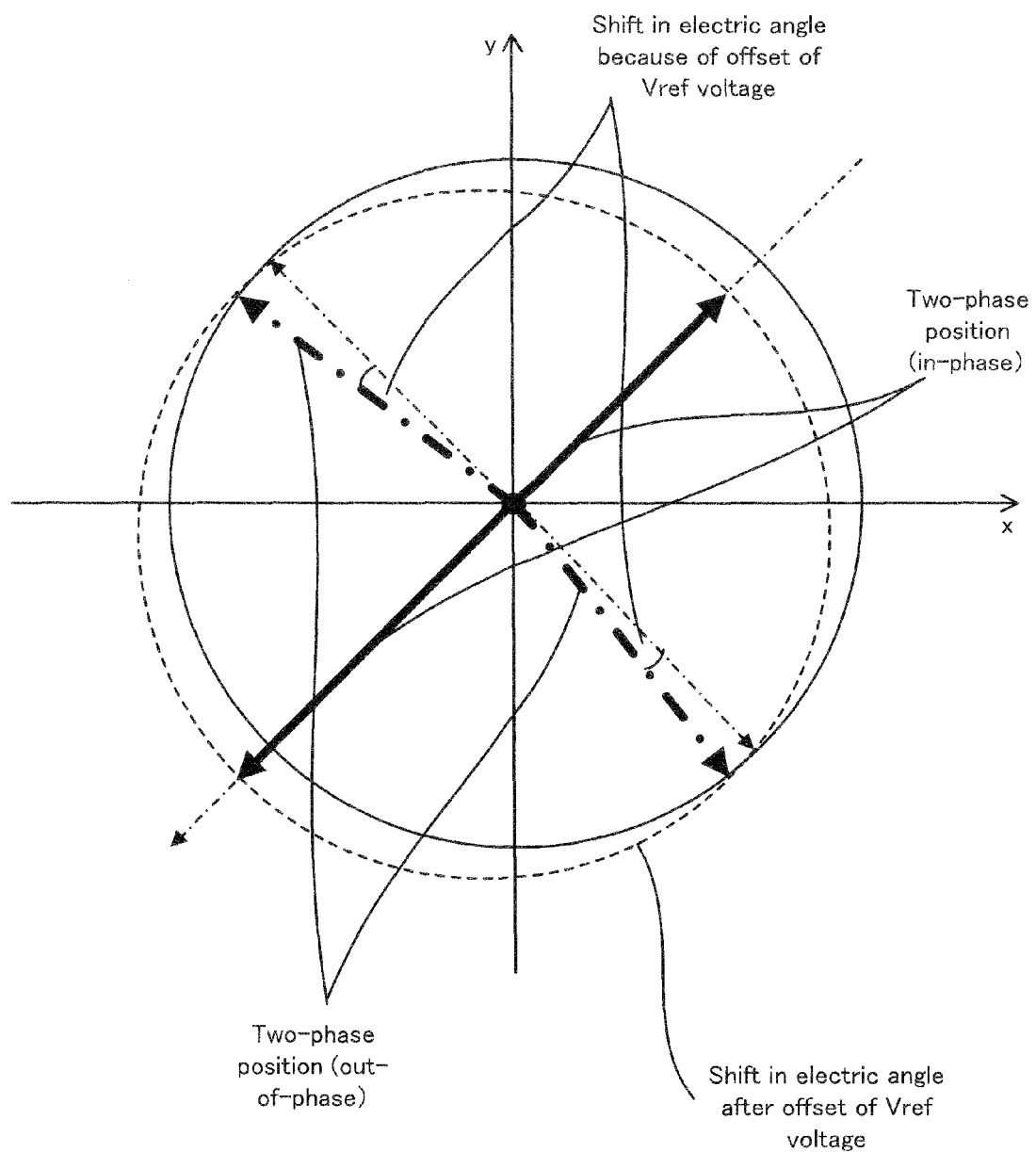

[FIG. 8]
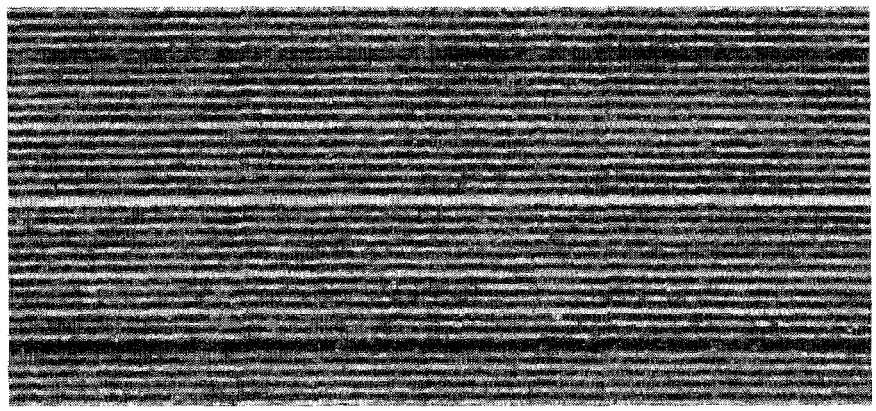
(a)
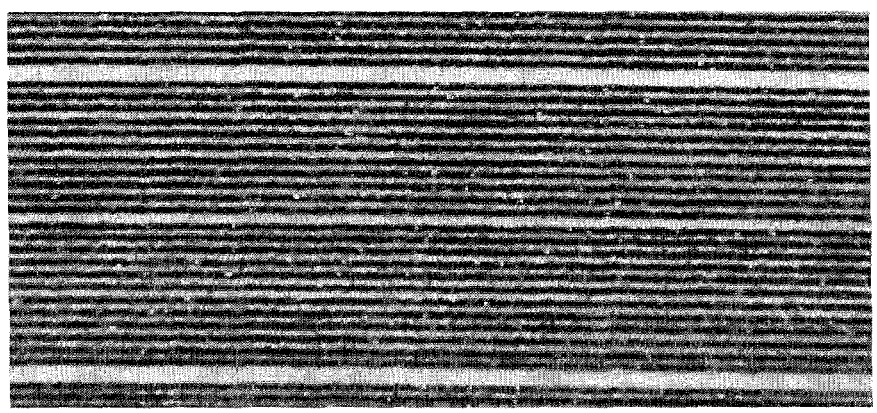
(b)
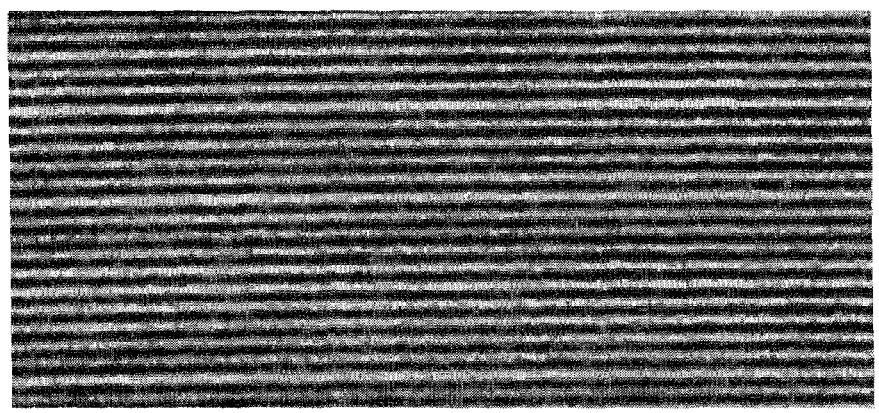
(c)

DRAWING APPARATUS AND METHOD, AND COMPUTER PROGRAM

TECHNICAL FIELD

The present invention relates to a drawing apparatus for and method of drawing a pattern such as a character, a graphic, and an image, for example, onto a label surface of a recording medium, and a computer program.

BACKGROUND ART

An optical disc such as a CD and a DVD allows large volumes of data to be recorded thereon easily. As the data recorded on the optical disc, for example, software, computer applications, computer files, video data, music data, and the like are listed as one specific example. Such an optical disc stores the data digitally. More specifically, a high-intensity laser beam is used to burn a small area of the optical disc (i.e. to change optical properties in the small area), so that a pit pattern according to the data to be recorded makes each small area reflective or unreflective. By this, it is possible to record the data onto the optical disc.

In recent years, in such an optical disc, a user's desired image, character, graphic, and the like have been frequently drawn on a label surface, which is a surface on the opposite side of a recording surface on which the data is recorded. Typically, a simple action of using a pen or the like to draw the desired image, character, graphic, and the like and an action of using an ink jet printer to draw the desired image, character, graphic, and the like can be listed as one specific example.

On the other hand, as a technology of drawing the desired image, character, graphic, and the like, there has been developed a technology of laminating a pigmented film or the like on the label surface and irradiating the label surface (i.e. the pigmented film) with a laser beam, to thereby draw the desired image, character, graphic, and the like onto the label surface (refer to patent documents 1 and 2). According to this technology, since the desired image, character, graphic, and the like can be drawn on the label surface using a hardware configuration for recording the data (specifically, an optical pickup or the like), it is possible to draw the clear image, character, graphic, and the like on the label surface, relatively easily.

Patent document 1: U.S. Pat. No. 6,771,297
Patent document 2: Japanese Patent Application Laid Open No. 2006-511034

DISCLOSURE OF INVENTION

Subject to be Solved by the Invention

By the way, in the technology of printing the image or the like in the pigmented film which is coated on the label surface, it is found by the prevent inventors or the like that a drawing accuracy is uneven depending on drawing conditions. Specifically, the occurrence of the drawing unevenness, i.e. periodically appearing concentric spaces or overlaps, is found by the prevent inventors or the like.

In view of the aforementioned problems, it is therefore an object of the present invention to provide, for example, a drawing apparatus and method which allow the desired image, character, graphic, and the like to be drawn highly accurately on the label surface of a recording medium, and a computer program for operating a computer as such a drawing apparatus.

Means for Solving the Subject

The above object of the present invention can be achieved by a drawing apparatus provided with: a drawing device for drawing a predetermined pattern onto a label surface, which is provided for a recording medium, by irradiating the label surface with a laser beam; a driving device for driving the drawing device along the label surface; a voltage applying device for applying each of a first voltage and a second voltage for driving the driving device, to the driving device; and a controlling device for controlling the voltage applying device such that the first voltage and the second voltage have a same polarity and amplitude when the drawing device is located at an initial position corresponding to a position at which the drawing of the desired pattern is started with respect to the label surface.

The above object of the present invention can be also achieved by a drawing method in a drawing apparatus provided with: a drawing device for drawing a predetermined pattern onto a label surface by irradiating a recording medium with a laser beam, the recording medium provided with a data recording surface and the label surface, which is disposed on an opposite side of the label surface; a driving device for driving the drawing device along the label surface; and a voltage applying device for applying each of a first voltage and a second voltage for driving the driving device, to the driving device, the drawing method provided with: a first controlling process of controlling the drawing device to draw the desired pattern; and a second controlling process of controlling the voltage applying device such that the first voltage and the second voltage have a same polarity and amplitude when the drawing device is located at an initial position corresponding to a position at which the drawing of the desired pattern is started with respect to the label surface.

The above object of the present invention can be also achieved by a computer program for controlling a computer provided in a drawing apparatus provided with: a drawing device for drawing a predetermined pattern onto a label surface, which is provided for a recording medium, by irradiating the label surface with a laser beam; a driving device for driving the drawing device along the label surface; a voltage applying device for applying each of a first voltage and a second voltage for driving the driving device, to the driving device; and a controlling device for controlling the voltage applying device such that the first voltage and the second voltage have a same polarity and amplitude when the drawing device is located at an initial position corresponding to a position at which the drawing of the desired pattern is started with respect to the label surface, the computer program making the computer function as at least the controlling device.

These operation and other advantages of the present invention will become more apparent from the embodiments explained below.

BRIEF DESCRIPTION OF DRAWINGS

FIG. 1 is a block diagram conceptually showing the basic structure of a recording/reproducing apparatus in an example.

FIG. 2 is a plan view showing the basic structure of an optical disc, which is a target for the operations of the recording/reproducing apparatus in the example.

FIG. 3 is a flowchart conceptually showing a flow of the operations by the recording/reproducing apparatus in the example.

FIG. 4 is a flowchart conceptually showing a flow of the track 0 search operation in a step S106 in FIG. 3.

FIG. 5 is a graph conceptually showing two types of voltages applied to a stepping motor.

FIG. 6 is a graph conceptually showing that the two types of voltages applied to the stepping motor are in phase and out-of-phase.

FIG. 7 is a graph conceptually showing an electric angle of the two types of voltages applied to the stepping motor.

FIG. 8 are enlarged plan views conceptually showing the drawn labels.

DESCRIPTION OF REFERENCE CODES

1 information recording/reproducing apparatus
11 spindle motor
12 optical pickup unit
13 optical pickup
14 thread
15 stepping motor
16 OPU controller
17 stepping controller
18 spindle controller
21 data bus
31 system controller
32 memory
100 optical disc
110 data recording layer
120 label layer
121 characteristic data recording area
122 label area
1211, 1212, 1213 pattern

BEST MODE FOR CARRYING OUT THE INVENTION

Hereinafter, as the best mode for carrying out the present invention, an explanation will be given on embodiments of the drawing apparatus and method, and the computer program of the present invention.

(Embodiment of Drawing Apparatus)

An embodiment of the drawing apparatus of the present invention is a drawing apparatus provided with: a drawing device (e.g. a pickup described later or the like) for drawing a predetermined pattern onto a label surface, which is provided for a recording medium, by irradiating the label surface with a laser beam; a driving device (e.g. a stepping motor described later or the like) for driving the drawing device along the label surface; a voltage applying device (e.g. a stepping controller described later or the like) for applying each of a first voltage and a second voltage for driving the driving device, to the driving device; and a controlling device (e.g. a system controller described later or the like) for controlling the voltage applying device such that the first voltage and the second voltage have a same polarity and amplitude when the drawing device is located at an initial position corresponding to a position at which the drawing of the desired pattern is started with respect to the label surface.

According to the embodiment of the drawing apparatus of the present invention, the drawing device irradiates the label surface with the laser beam, to thereby draw the desired pattern (e.g. a desired image, a desired character, a desired graphic, and the like) onto the label surface. Specifically, using the fact that the reflectance of the pigmented film in a portion that is irradiated with the laser beam is different from the reflectance of the pigmented film in a portion that is not irradiated with the laser beam, for example, in the case where a pigmented file or the like is applied on the label surface, the desired pattern (e.g. a desired image, a desired character, a desired graphic, and the like) is drawn on the label surface.

At this time, the drawing device is driven (i.e. displaced) in the radial direction of the recording medium (in other words, the tracking direction) along the label surface, by the operations of the driving device. To the driving device, each of the first voltage and the second voltage for driving the driving device is applied by the operations of the voltage applying device. Since the driving amount of the driving device can be controlled in accordance with the amount of application and application timing of the first voltage and the second voltage, the drawing device can be driven so as to irradiate a desired small area on the label surface with the laser beam, so that the desired pattern can be drawn on the label surface.

In the embodiment, in particular, by the operations of the controlling device, the operations of the voltage applying device are controlled such that the first voltage and the second voltage have the same polarity and amplitude when the drawing device is located at the initial position corresponding to the position at which the drawing of the desired pattern is started with respect to the label surface. As the initial position, for example, a position following an area to perform an initial operation by the drawing apparatus, a position at which an initial track to start the drawing exists, and a track position whose track number is zero are listed as one specific example. The track, however, is not necessarily physically formed on the label surface, and it is only necessary that the drawing apparatus can substantially regard as that there is the track when performing the drawing operation. Hereinafter, in the embodiment, the situation the first voltage and the second voltage have the same polarity and amplitude is expressed by that "the first voltage and the second voltage are in-phase."

According to the drawing apparatus in the embodiment having such a structure, it is possible to increase the driving accuracy of the drawing device, as detailed later with reference to the drawings. More specifically, the driving device of the drawing apparatus can be displaced by a predetermined distance, highly accurately. By this, it is possible to irradiate or not irradiate the desired small area on the label surface with the laser beam irradiated from the drawing device. In other words, it is possible to preferably prevent such a disadvantage that the laser beam is not irradiated onto the small area which is desired to be irradiated with the laser beam, or that the laser beam is irradiated onto the small area which is not desired to be irradiated with the laser beam. Thus, it is possible to draw the desired pattern, highly accurately, on the label surface of the recording medium.

In one aspect of the embodiment of the drawing apparatus of the present invention, each of the first voltage and the second voltage is an alternating-current voltage.

According to this aspect, by applying the first voltage and the second voltage, which are the alternating-current voltages, to the driving device, it is possible to preferably drive the drawing device and to preferably receive the aforementioned effects.

In another aspect of the embodiment of the drawing apparatus of the present invention, the controlling device controls the voltage applying device such that the first voltage and the second voltage have the same polarity and amplitude when the drawing device is located at the initial position after an initial operation by the drawing device.

According to this aspect, the voltage applying device is controlled such that the first voltage and the second voltage are in-phase when the drawing device is located at the initial position (i.e. before the drawing is started) after the initial operation (e.g. an operation of adjusting the rotational speed of the recording medium, an operation of adjusting the position of the drawing device, an operation of adjusting the intensity of the laser beam, or the like) is ended. Therefore, it is possible to preferably receive the aforementioned effects in the entire operation of drawing the desired pattern.

In another aspect of the embodiment of the drawing apparatus of the present invention, the recording medium is further provided with a data recording surface, which is disposed on an opposite side of the label surface, and the drawing device records desired data onto the data recording surface by irradiating the data recording surface with the laser beam.

According to this aspect, while drawing the desired pattern on the label surface with the drawing device, it is possible to record the desired data onto the data recording surface with the same drawing device. In other words, using the same apparatus, it is possible to record the data onto the data recording surface and to draw the pattern onto the label surface.

Incidentally, from the viewpoint that the data can be recorded onto the data recording surface, the drawing apparatus in the embodiment can be expressed as a recording apparatus having a drawing function.

(Embodiment of Drawing Method)

An embodiment of the drawing method of the present invention is a drawing method in a drawing apparatus provided with: a drawing device for drawing a predetermined pattern onto a label surface by irradiating a recording medium with a laser beam, the recording medium provided with a data recording surface and the label surface, which is disposed on an opposite side of the label surface; a driving device for driving the drawing device along the label surface; and a voltage applying device for applying each of a first voltage and a second voltage for driving the driving device, to the driving device (in other words, the aforementioned embodiment of the drawing apparatus of the present invention (including its various aspects)), the drawing method provided with: a first controlling process of controlling the drawing device to draw the desired pattern; and a second controlling process of controlling the voltage applying device such that the first voltage and the second voltage have a same polarity and amplitude when the drawing device is located at an initial position corresponding to a position at which the drawing of the desired pattern is started with respect to the label surface.

The embodiment of the drawing method of the present invention can receive the same various effects as those which can be received by the aforementioned embodiment of the drawing apparatus of the present invention.

In response to the aforementioned various aspects in the embodiment of the drawing apparatus of the present invention, the embodiment of the drawing method of the present invention can adopt various aspects.

(Embodiment of Computer Program)

An embodiment of the computer program of the present invention is a computer program for controlling a computer provided in a drawing apparatus provided with: a drawing device for drawing a predetermined pattern onto a label surface, which is provided for a recording medium, by irradiating the label surface with a laser beam; a driving device for driving the drawing device along the label surface; a voltage applying device for applying each of a first voltage and a second voltage for driving the driving device, to the driving device; and a controlling device for controlling the voltage applying device such that the first voltage and the second voltage have a same polarity and amplitude when the drawing device is located at an initial position corresponding to a position at which the drawing of the desired pattern is started with respect to the label surface (in other words, the aforementioned embodiment of the drawing apparatus of the present invention (including its various aspects)), the computer program making the computer function as at least the controlling device.

According to the embodiment of the computer program of the present invention, the aforementioned embodiment of the drawing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the aforementioned various aspects in the embodiment of the drawing apparatus of the present invention, the embodiment of the computer program of the present invention can also adopt various aspects.

The above object of the present invention can be also achieved by a computer program product in a computer-readable medium for tangibly embodying a program of instructions executable by a computer provided in a drawing apparatus provided with: a drawing device for drawing a predetermined pattern onto a label surface, which is provided for a recording medium, by irradiating the label surface with a laser beam; a driving device for driving the drawing device along the label surface; a voltage applying device for applying each of a first voltage and a second voltage for driving the driving device, to the driving device; and a controlling device for controlling the voltage applying device such that the first voltage and the second voltage have a same polarity and amplitude when the drawing device is located at an initial position corresponding to a position at which the drawing of the desired pattern is started with respect to the label surface (in other words, the aforementioned embodiment of the drawing apparatus of the present invention (including its various aspects)), the computer program product making the computer function as at least the controlling device.

According to the embodiment of the computer program product of the present invention, the aforementioned embodiment of the drawing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the drawing apparatus of the present invention.

Incidentally, in response to the aforementioned various aspects in the embodiment of the drawing apparatus of the present invention, the embodiment of the computer program product of the present invention can also adopt various aspects.

These operation and other advantages of the present invention will become more apparent from the example explained below.

As explained above, according to the embodiment of the drawing apparatus of the present invention, it is provided with the drawing device, the driving device, the voltage applying device, and the controlling device. According to the embodiment of the drawing method of the present invention, it is provided with the first controlling process and the second controlling process. Therefore, it is possible to draw the desired image, character, graphic, and the like onto the label surface of the recording medium, highly accurately.

Example

Hereinafter, an example of the present invention will be explained with reference to the drawings. Incidentally, the following example is explained by using the construction that the drawing apparatus or the like of the present invention is applied to a recording/reproducing apparatus for an optical disc.

(1) Basic Structure

Firstly, with reference to FIG. 1 and FIG. 2, an explanation will be given on the basic structures of a recording/reproducing apparatus in an example and an optical disc, which is a target for the operations by the recording/reproducing apparatus. FIG. 1 is a block diagram conceptually showing the basic structure of the recording/reproducing apparatus in the example. FIG. 2 is a plan view showing the basic structure of the optical disc, which is a target for the operations of the recording/reproducing apparatus in the example.

As shown in FIG. 1, a recording/reproducing apparatus 1 in the example is provided with a spindle motor 11, an optical pickup (OPU) unit 12, an optical pickup 13, a thread 14, a stepping motor 15, an OPU controller 16, a stepping controller 17, a spindle controller 18, a system controller 31, and a memory 32.

The spindle motor 11 is a motor for rotating and stopping an optical disc 100. More specifically, the spindle motor 11 is adapted to rotate the optical disc 100 at a predetermined speed and stop it, under spindle servo by the spindle controller 18.

The optical pickup unit 12 constitutes one specific example of the "drawing device" of the present invention. The optical pickup unit 12 is a case for holding the optical pickup 13 and the thread 14.

The optical pickup 13 is provided with, for example, a semiconductor laser device, a collimator, an objective lens, and the like, which are not illustrated, in order to perform data recording and reproduction on the optical disc 100. More specifically, the optical pickup 13 irradiates the optical disc 100 with a laser beam LB as reading light with a first power in the reproduction, and as writing light with a second power with it modulated in the recording. In addition, the optical pickup 13 irradiates the optical disc 100 with the laser beam LB when a label is drawn on the topical disc 100.

Incidentally, the optical disc 100, which is the target for the operations of the recording/reproducing apparatus in the example, has a circular shape as in a DVD, for example, as shown in FIG. 1 and FIG. 2, and the optical disc 100 has a recording layer 110 laminated on one side and a label layer 120 laminated on the other side. The data recording layer 110 is irradiated with the laser beam LB from the lower side in FIG. 1, by which the data recording and reproduction are performed. On the other hand, the label layer 120 is irradiated with the laser beam LB from the upper side in FIG. 1, by which the label is drawn.

The data recording layer 110 of the optical disc 100 is provided with, for example, a pigmented film or a phase change film whose properties (e.g. reflective properties) are changed by the irradiation of the laser beam LB. The data recording layer 110 is provided with a lead-in area, a user data area, and a lead-out area, centered on a center hold 130 (refer to FIG. 2). The data recording layer 110 also has a track such as a groove track and a land track, alternately placed spirally or concentrically, centered on the center hole 130. Moreover, on the track, the data is divided and recorded by a unit of ECC block. The ECC block is a data management unit by which the data can be error-corrected.

On the other hand, the label layer 120 of the optical disc 100 is provided with, for example, a pigmented film whose properties (e.g. reflective properties) are changed by the irradiation of the laser beam LB. The label layer 120 is not provided with the aforementioned track; however, obviously, it may be also provided with the track. The label layer 120 is provided particularly with a characteristic data recording area 121 on the innermost side and a label area 122, in which the label (i.e. one specific example of the "desired pattern" of the present invention) is actually drawn, on the outer side of the characteristic data recording area 121.

The characteristic data recording area 121, as shown in the enlarged view thereof shown on the lower side in FIG. 2, has a pattern 1211 formed, in which a rectangular pattern that has a high optical reflectance and a rectangular pattern that has the same size as the rectangular pattern with a high optical reflectance and that has a low optical reflectance are regularly arranged. The pattern 1211 is read by a photo encoder, which is not illustrated in FIG. 1. The pattern 1211 enables the information recording/reproducing apparatus 1 to obtain information about the velocity of the optical disc 100 (specifically, angular velocity or rotational speed), in performing the label drawing into the label area 122. By this, the information recording/reproducing apparatus 1 can adjust or recognize the velocity of the optical disc 100 in performing the label drawing into the label area 122.

The characteristic data recording area 121, as shown in the enlarged view thereof shown on the lower side in FIG. 2, also has a pattern 1212 formed, in which a rectangular pattern that has a high optical reflectance and a rectangular pattern that has a low optical reflectance are irregularly arranged. In particular, each of the rectangular pattern with a high optical reflectance and the rectangular pattern with a low optical reflectance has various sizes depending on a position at which the rectangular pattern is formed. The pattern 1212 enables the information recording/reproducing apparatus 1 to obtain information about the angle direction of the rotating optical disc 100 (namely, a direction in which such a line is directed that extends from the center of the optical disc 100 toward a predetermined point in the surrounding of the disc). By this, the information recording/reproducing apparatus 1 can adjust or recognize the angle of the optical disc 100 in performing the label drawing into the label area 122.

The characteristic data recording area 121, as shown in the enlarged view thereof shown on the lower side in FIG. 2, also has a pattern 1213 formed, in which a saw-teeth pattern that has a high optical reflectance and a pattern that is disposed oppositely to the saw-teeth pattern with a high optical reflectance and that has a low optical reflectance are regularly arranged. The pattern 1213 enables the information recording/reproducing apparatus 1 to adjust the position of the optical pickup 13 in the radial direction of the optical disc 100, highly accurately. In other words, it is possible to adjust the tracking accuracy of the optical pickup 113 by a not-illustrated actuator described later. More specifically, a duty ratio of reflective light of the laser beam LB irradiated on the pattern 1213 allows the adjustment of the tracking accuracy of the optical pickup unit 11. When a predetermined voltage is applied to the actuator, the travel distance of the optical pickup 13 from a position at which the duty ratio is 50% (i.e. the central position in the radial direction of the pattern 1213) is detected on the basis of the duty ratio. This operation is repeated while the voltage applied to the actuator is changed. By this, it is possible to obtain a correlation between the voltage applied to the actuator and the travel distance of the optical pickup 13. After that, the obtained correlation is used to adjust the position of the optical pickup 13 in performing the label drawing into the label area 122.

Incidentally, the pattern 1211 formed on the relatively inner side is referred to as an inner ring. The inner ring is formed in an area with radius positions of 19.00 mm to 21.15 mm on the optical disc 100. On the other hand, the patterns 1212 and 1213 are referred to as an outer ring. The outer ring is formed in an area with radius positions of 21.15 mm to 21.80 mm on the optical disc 100. Each pattern formed in the characteristic data recording area 121 may be read by the information recording/reproducing apparatus 1 while the label is drawn into the label area 122, or each pattern may be read before the label is drawn into the label area 122. Each pattern may be also formed by a silk screen printing method or another method.

In the label area 122, as shown on the upper side in FIG. 2, a user's desired label (e.g. a character, graphic, image, or the like) can be drawn. The desired label is drawn as a so-called black-and-white pattern, using a difference between the optical reflectance in the small area that is irradiated with the laser beam LB and the optical reflectance in the small area that is not irradiated with the laser beam LB.

In FIG. 1 again, the thread 14 is subjected to a driving force by the stepping motor 15 and is driven in the radial direction of the optical disc 100 together with the optical pickup unit 11.

Incidentally, the position of the optical pickup 13 is adjusted in the radial direction of the optical disc 100 because of the displacement of the thread 14 by the stepping motor 15; however, the position is further adjusted by a not-illustrated actuator disposed in the optical pickup unit 12. Specifically, the displacement of the thread 14 by the stepping motor 15 allows the position of the optical pickup 13 to be determined. Then, the irradiation position of the laser beam LB is determined by the not-illustrated actuator, which can move with a higher resolution.

The stepping motor 15 constitutes one specific example of the "driving device" of the present invention. In accordance with the voltage applied by the stepping controller 17, the thread 14 is displaced in the radial direction of the optical disc 100. Incidentally, in the example, the stepping motor 15 uses a two-phase coil as a coil used for a stator. Therefore, two types of voltages are applied by the stepping controller 17 in relation to each coil.

The OPU controller 16 is provided with, for example, a laser diode driver or the like and controls an operation of irradiating the laser beam LB by the optical pickup 13. Specifically, the OPU controller 16 controls the power, irradiation timing, and the like of the laser beam LB (in other words, the operations of the optical pickup 13) in cooperation with the stepping controller 17 and the spindle controller 18, under the control of the system controller 31.

The stepping controller 17 constitutes one specific example of the "voltage applying device" of the present invention. The stepping controller 17 controls the voltage to be applied to the stepping motor 15, to thereby control the travel distance of the thread 14 by the stepping motor 15. Specifically, the stepping controller 17 controls the travel distance of the thread 14 (in other words, the operations of the stepping motor 15) in cooperation with the OPU controller 16 and the spindle controller 18, under the control of the system controller 31.

The spindle controller 18 controls the rotation of the optical disc 100 by the spindle motor 11. Specifically, the spindle controller 18 controls the rotational speed, rotational angle, or the like of the optical disc 100 (in other words, the operations of the spindle motor 11) in cooperation with the OPU controller 16 and the stepping controller 17, under the control of the system controller 31.

The system controller 31 is connected to the OPU controller 16, the stepping controller 17, the spindle controller 18, and the memory 32 through the data bus 21. The system controller 31 outputs a control command to each of the OPU controller 16, the stepping controller 17, and the spindle controller 18, to thereby control the entire information recording/reproducing apparatus 1. Normally, software or firmware for the system controller 31 operating is stored in the memory 32.

The memory 32 is provided with a ROM area which stores therein a program for the information recording/reproducing apparatus 1 operating (i.e. firmware); a RAM area which temporarily stores therein data used during the operations by the information recording/reproducing apparatus 1; and the like.

(2) Operation Principle

Next, with reference to FIG. 3 to FIG. 8, an explanation will be given on the operations (in particular, the drawing operation into the label layer 120) by the information recording/reproducing apparatus 1 in the example. Here, with reference to FIG. 3, the operations as a whole by the information recording/reproducing apparatus 1 in the example will be explained, and a more detailed explanation will be given with reference to FIG. 4 to FIG. 8 as occasion demands. FIG. 3 is a flowchart conceptually showing a flow of the operations by the information recording/reproducing apparatus 1 in the example.

As shown in FIG. 3, firstly, it is judged whether or not the optical disc loaded on the information recording/reproducing apparatus 1 is the optical disc 100 on which the label drawing can be performed by the information recording/reproducing apparatus 1 (i.e. the aforementioned optical disc 100 in the example), under the control of the system controller 31 (step S101).

As a result of the judgment in the step S101, if it is judged that the optical disc loaded on the information recording/reproducing apparatus 1 is not the optical disc 100 on which the label drawing can be performed by the information recording/reproducing apparatus 1 (the step S101: No), the operations in a step S102 to a step S107 which will be explained below are not performed, and the operation according to the loaded optical disc is performed (step S108).

On the other hand, as a result of the judgment in the step S101, if it is judged that the optical disc loaded on the information recording 1 reproducing apparatus 1 is the optical disc 100 on which the label drawing can be performed by the information recording/reproducing apparatus 1 (the step S101: Yes), then the spindle motor 15 is locked under the control of the spindle controller 18 (step S102). Specifically, the inner ring including the aforementioned pattern 1211 is read, and the rotational speed of the spindle motor 15 (in other words, the rotational speed of the optical disc 100) is adjusted in accordance with the reading result. After that, the rotational speed of the spindle motor 15 is kept constant.

Then, after the outer ring including the aforementioned patterns 1212 and 1213 is searched (step S103), focus servo is turned ON (step S104).

Then, the outer ring searched in the step S103 is used to adjust a tracking accuracy (step S105).

Then, a track 0, which is a position to start the drawing of the desired label into the label area 122, is searched for (step S106). The label layer 120 does not have a physical track, so the track 0 is virtual; however, for example, it exists in a position with a radial position of 23.80±0.03 mm on the optical disc 100. Incidentally, the track 0 search operation will be detailed later (refer to FIG. 4 and the like).

Then, the desired label is drawn into the label area 122 (step S107).

Next, with reference to FIG. 4, the track 0 search operation in the step S106 in FIG. 3 will be explained. FIG. 4 is a flowchart conceptually showing a flow of the track 0 search operation in the step S106 in FIG. 3.

As shown in FIG. 4, an electric angle of the stepping motor 14 (i.e. an electric angle between the two types of voltages applied to the stepping motor 15) at the time when the adjustment of the tracking accuracy is ended is obtained by the operations of the stepping controller 17 or the system controller 31 (step S201).

Then, the thread 14 is displaced from the current position toward the outer side of the optical disc 100 so that the thread 14 is located to a position where the electric angle of the stepping motor 14 is two-phase, by the operations of the stepping controller 17 or the system controller 31 (step S202). The electric angle of the stepping motor 15 is two-phase when the displacement of the thread 14 is completed in the step S202. Incidentally, this operation is performed in view of backlash, in which the travel distance when the thread 14 is displaced from the inner side to the outer side of the optical disc 100 is different from the travel distance when the thread 14 is displaced from the outer side to the inner side of the optical disc 100.

Now with reference to FIG. 5, an explanation is given on the two types of voltages applied to the stepping motor 15. FIG. 5 is a graph conceptually showing the two types of voltages applied to the stepping motor 15.

As shown in FIG. 5, two types of voltages V1 and V2 applied to the stepping motor 15 are alternating-current voltages with a predetermined amplitude with respect to a reference voltage Vref. Applying the voltages V1 and V2 by one-step unit (in other words, by a 180-degree unit in phase) by the stepping controller 17 allows the stepping motor 15 to displace the thread 14 discretely. In the example, applying the voltages V1 and V2 by one-step unit allows the thread 14 to be displaced by 0.3 mm in the radial direction of the optical disc 100. The adjustment of the position of the optical pickup 13 by the unit of 0.3 mm or less is performed by the aforementioned not-illustrated actuator.

Here, the expression that "the electric angle of the stepping motor 15 is two-phase" denotes that the absolute value of the amplitude of the voltage V1 is the same as that of the voltage V2.

Moreover, the expression, used in the explanation below, that "the electric angle of the stepping motor 15 is in-phase" denotes that the absolute value of the amplitude of the voltage V1 is the same as that of the voltage V2, and that the polarity of the voltage V1 is the same as that of the voltage V2.

Moreover, the expression, used in the explanation below, that "the electric angle of the stepping motor 15 is out-of-phase" denotes that the absolute value of the amplitude of the voltage V1 is the same as that of the voltage V2 and that the polarity of the voltage V1 is opposite to that of the voltage V2.

In FIG. 4 again, then the current position of the thread 14 is detected using a duty ratio (or saw teeth duty) obtained by reading the pattern 1213 in the outer ring (step S203). This operation is performed to calculate the travel distance necessary to displace the thread 14 to the track 0.

Then, it is judged whether or not the current position of the thread 14 is a position at which the electric angle of the stepping motor 15 is in-phase, by the operations of the stepping controller 17 or the system controller 31 (step S204).

As a result of the judgment in the step S204, if it is judged that the current position of the thread 14 is a position at which the electric angle of the stepping motor 15 is in-phase (i.e. the current electric angle of the stepping motor 15 is in-phase) (the step S204: Yes), the number of steps of the voltages V1 and V2 necessary to displace the thread 14 to the track 0 is calculated on the basis of the position of the thread 14 detected in the step S203 by the operations of the stepping controller 17 or the system controller 31 (step S206). For example, considering that applying the voltages V1 and V2 by the one-step unit allows the thread 14 to be displaced by 0.3 mm, the number of steps is X/0.3 if the travel distance necessary to displace the thread 14 to the track 0 is X mm.

Then, the tread 14 is displaced to the position of the track 0 by the operations of the stepping controller 17 or the system controller 31 (step S207). At this time, the electric angle of the stepping motor 15 is kept in-phase. Namely, the operations of the stepping motor 15 are controlled by treating a transition from a condition that the electric angle of the stepping motor 15 is in-phase to a condition that the electric angle of the stepping motor 15 becomes in-phase again being as one-step displacement.

After that, in performing the label drawing in the step S107 in FIG. 3, the electric angle of the stepping motor 15 is kept in-phase. Namely, the operations of the stepping motor 15 are controlled by treating the transition from the condition that the electric angle of the stepping motor 15 is in-phase to the condition that the electric angle of the stepping motor 15 becomes in-phase again as one-step displacement.

On the other hand, if it is judged that the current position of the thread 14 is a position at which the electric angle of the stepping motor 15 is not in-phase (i.e. the current electric angle of the stepping motor 15 is out-of-phase) (the step S204: No), the thread 14 is displaced such that the thread 14 is located at a position at which the electric angle of the stepping motor 15 is in-phase, by the operations of the stepping controller 17 or the system controller 31 (step S205). Then, the operations in the steps S206 and S207 are performed.

As explained above, according to the information recording/reproducing apparatus 1 in the example, the electric angle of the stepping motor 15 is set such that the electric angle of the stepping motor 15 is in-phase when the drawing of the desired label into the label area 122 is started. By this, it is possible to perform the displacement of the thread 14 by the one-step unit, highly accurately. Hereinafter, with reference to FIG. 6 to FIG. 8, a more detailed explanation will be given on effects that can be received by the information recording/reproducing apparatus 1 in the example. FIG. 6 is a graph conceptually showing that the two types of voltages applied to the stepping motor 15 are in phase and out-of-phase. FIG. 7 is a graph conceptually showing the electric angle of the two types of voltages applied to the stepping motor 15. FIG. 8 are enlarged plan views conceptually showing the drawn labels.

As shown by an arrow in a thick line in FIG. 6, if the electric angle of the stepping motor 15 is in-phase when the drawing of the desired label into the label area 122 is started, it is possible to maintain a condition such that the absolute value of the amplitude of the voltage V1 is the same as that of the voltage V2 and that the polarity of the voltage V2 is the same as that of the voltage V2, even if offset (Voff) occurs in the reference voltage. The stepping motor 15 is driven by the one-step unit (i.e. by the 180-degree unit in phase of the voltages V1 and V2), so that it is possible to maintain the condition that the electric angle of the stepping motor 15 is in-phase even in the subsequent operations.

On the other hand, as shown by an arrow in an alternate long and short dash line in FIG. 6, if the electric angle of the stepping motor 15 is out-of-phase when the drawing of the desired label into the label area 122 is started, there is a difference between the absolute value of the amplitude of the voltage V1 and that of the voltage V2 if the offset (Voff) occurs in the reference voltage. This causes a shift in the electric angle of the voltages, resulting in variations in the travel distance by the one-step unit.

The variations in the travel distance by the one-step unit will be explained more specifically, with reference to FIG. 7. As shown in FIG. 7, the occurrence of the offset (Voff) in the reference voltage causes the shift in the electric angle when the electric angle of the stepping motor 15 is out-of-phase. Thus, the displacement of the thread 14 by the one-step unit is performed not by a 180-degree unit but a unit of 180-degree±α (wherein α>0). More specifically, firstly the one-step displacement is performed by the unit of 180-degree+α, and then the one-step displacement is performed by the unit of 180-degree−α. Then, the operation is repeated. This means, if it is converted to the travel distance of the thread 14, that the one-step displacement is performed by a unit of 0.3+β (wherein β>0) and then the one-step displacement is performed by a unit of 0.3 mm−β. This is not preferable from the view point of the highly accurate displacement of the thread 14. The displacement of the thread in this manner causes periodic spots or unevenness in the drawn labels. More specifically, as shown in FIG. 8(*a*), the variation of a space between track-shaped drawing patterns causes a portion in which the adjacent drawing patterns overlap (a dark drawing pattern portion in FIG. 8(*a*)) and a blank portion in which the drawing pattern is not drawn (i.e. a gap) to appear periodically and alternately. Alternatively, as shown in FIG. 8(*b*), the magnitude of the gap in which the track-shaped drawing pattern is not drawn varies periodically.

According to the example, however, since the shift is not generated in the electric angle even if the offset occurs in the reference voltage, the displacement in each one-step is performed by the 180-degree unit. Thus, the thread 14 can be displaced highly accurately, by the unit of 0.3 mm. As described above, since the thread 14 can be displaced highly accurately by the unit of 0.3 mm, the periodic spots or unevenness is not caused in the drawn label as shown in FIG. 8(*c*), and it is possible to draw the relatively clean label.

As described above, according to the information recording/reproducing apparatus 1 in the example, the thread 14 (in other words, the optical pickup 13) can be displaced in the radial direction of the optical disc 100, highly accurately or correctly. Thus, it is possible to draw the relatively clean label.

Incidentally, in the aforementioned example, the thread 14 is displaced from the current position toward to the outer side of the optical disc 100 to be located at a position at which the electric angle of the stepping motor 15 is two-phase, in the step S202 in FIG. 4. Depending on the specification of the information recording/reproducing apparatus 1, however, the thread 14 may be displaced from the current position toward to the outer side of the optical disc 100 to be located at a position at which the electric angle of the stepping motor 15 is in-phase, in the step S202. By virtue of such construction, it is possible to receive the aforementioned effects while further simplifying the operations from the step S202 to the step S205 in FIG. 4.

In the aforementioned example, the electric angle of the stepping motor 15 used for the label drawing is also explained; however, the aforementioned effects can be received by adopting the aforementioned structure in not only the label drawing but also various applications in which the stepping motor 15 is used.

The present invention is not limited to the aforementioned example, but various changes may be made, if desired, without departing from the essence or spirit of the invention which can be read from the claims and the entire specification. A drawing apparatus and method, and a computer program, all of which involve such changes, are also intended to be within the technical scope of the present invention.

The invention claimed is:

1. A drawing apparatus comprising:
    a drawing device for drawing a predetermined pattern onto a label surface, which is provided for a recording medium, by irradiating the label surface with a laser beam;
    a driving device for driving said drawing device along the label surface;
    a voltage applying device for applying each of a first voltage and a second voltage for driving said driving device, to said driving device; and
    a controlling device for controlling said voltage applying device such that the first voltage and the second voltage have a same polarity and a same instantaneous voltage value upon said drawing device being located at an initial position corresponding to a position at which the drawing of the desired pattern is started with respect to the label surface.

2. The drawing apparatus according to claim 1, wherein each of the first voltage and the second voltage is an alternating-current voltage.

3. The drawing apparatus according to claim 1, wherein said controlling device controls said voltage applying device such that the first voltage and the second voltage have the same polarity and the same instantaneous voltage value upon said drawing device being located at the initial position after an initial operation by said drawing device.

4. The drawing apparatus according to claim 1, wherein
    the recording medium further comprises a data recording surface, which is disposed on an opposite side of the label surface, and
    said drawing device records desired data onto the data recording surface by irradiating the data recording surface with the laser beam.

5. A drawing method in a drawing apparatus comprising: a drawing device for drawing a predetermined pattern onto a label surface by irradiating a recording medium with a laser beam, the recording medium comprising a data recording surface and the label surface, which is disposed on an opposite side of the label surface; a driving device for driving said drawing device along the label surface; and a voltage applying device for applying each of a first voltage and a second voltage for driving said driving device, to said driving device, said drawing method comprising:
    a first controlling process of controlling said drawing device to draw the desired pattern; and
    a second controlling process of controlling said voltage applying device such that the first voltage and the second voltage have a same polarity and a same instantaneous voltage value upon said drawing device being located at an initial position corresponding to a position at which the drawing of the desired pattern is started with respect to the label surface.

6. A non-transitory computer readable recording medium recording thereon a computer program for controlling a computer provided in a drawing apparatus comprising: a drawing device for drawing a predetermined pattern onto a label surface, which is provided for a recording medium, by irradiating the label surface with a laser beam; a driving device for driving said drawing device along the label surface; a voltage applying device for applying each of a first voltage and a second voltage for driving said driving device, to said driving device; and a controlling device for controlling said voltage applying device such that the first voltage and the second voltage have a same polarity and a same instantaneous voltage value upon said drawing device being located at an initial position corresponding to a position at which the drawing of the desired pattern is started with respect to the label surface, said computer program making the computer function as at least said controlling device.

* * * * *